US007693274B2

(12) United States Patent
Eppel et al.

(10) Patent No.: US 7,693,274 B2
(45) Date of Patent: Apr. 6, 2010

(54) SYSTEM AND METHOD FOR RETURN TO AGENTS DURING A CONTACT CENTER SESSION

(75) Inventors: Martin R. Eppel, Santa Clara, CA (US); Labhesh Patel, Mountain View, CA (US); Aaron Tong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1088 days.

(21) Appl. No.: 11/133,933

(22) Filed: May 20, 2005

(65) Prior Publication Data

US 2006/0262921 A1    Nov. 23, 2006

(51) Int. Cl.
*H04M 3/00* (2006.01)
*H04M 5/00* (2006.01)

(52) U.S. Cl. ............... 379/265.01; 379/265.02; 379/266.01; 379/266.1; 379/309; 379/201.01; 379/88.18

(58) Field of Classification Search ............ 379/265.01, 379/265.02, 266.01, 266.1, 309, 88.18, 201.01
See application file for complete search history.

(56) References Cited

U.S. PATENT DOCUMENTS

| 4,472,833 | A |   | 9/1984  | Turrell et al. |
|-----------|---|---|---------|----------------|
| 5,249,223 | A |   | 9/1993  | Vanacore |
| 5,493,608 | A |   | 2/1996  | O'Sullivan |
| 5,509,064 | A |   | 4/1996  | Welner |
| 5,537,470 | A |   | 7/1996  | Lee |
| 5,866,890 | A |   | 2/1999  | Neuner |
| 5,915,011 | A | * | 6/1999  | Miloslavsky ............ 379/219 |
| 5,963,632 | A | * | 10/1999 | Miloslavsky ............ 379/219 |
| 6,059,184 | A |   | 5/2000  | Ahlstorm et al. |

(Continued)

FOREIGN PATENT DOCUMENTS

EP    1 030 504 A2    8/2000

(Continued)

OTHER PUBLICATIONS

Nigel Ward and Satoshi Nakagawa, "Automatic User-Adaptive Speaking Rate Selection For Information Delivery", Jun. 25, 2002, (4 pages), University of Tokyo, Tokyo, Japan.

(Continued)

*Primary Examiner*—Quynh H Nguyen
(74) *Attorney, Agent, or Firm*—Law Office of Bradley J. Bereznak

(57) ABSTRACT

A system and method for servicing a caller at a contact center includes a processor subsystem and one or more modules that include code executable by the processor subsystem. Execution of the code invoking an automatic call distributor (ACD) collaborative application that provides the caller with a visual or aural call session history that lists each agent with whom the caller has interacted. The ACD collaborative application also providing the caller with an option to request return to a previous agent listed in the call session history. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

7 Claims, 3 Drawing Sheets

U.S. PATENT DOCUMENTS

| | | | |
|---|---|---|---|
| 6,137,862 A | 10/2000 | Atkinson et al. | |
| 6,160,877 A | 12/2000 | Tatchell et al. | |
| 6,259,786 B1 | 7/2001 | Gisby | |
| 6,546,082 B1 | 4/2003 | Alcendor et al. | |
| 6,567,848 B1 | 5/2003 | Kusuda et al. | |
| 6,587,545 B1 | 7/2003 | Antonucci et al. | |
| 6,675,216 B1 | 1/2004 | Quatrano et al. | |
| 6,687,877 B1 * | 2/2004 | Sastry et al. | 715/201 |
| 6,697,457 B2 | 2/2004 | Petrushin | |
| 6,798,768 B1 | 9/2004 | Gallick et al. | |
| 6,807,269 B1 * | 10/2004 | Atwood et al. | 379/220.01 |
| 6,826,194 B1 * | 11/2004 | Vered et al. | 370/449 |
| 6,845,361 B1 | 1/2005 | Dowling | |
| 6,859,776 B1 | 2/2005 | Cohen et al. | |
| 6,879,586 B2 | 4/2005 | Miloslavsky et al. | |
| 6,882,641 B1 | 4/2005 | Gallick et al. | |
| 6,940,963 B2 | 9/2005 | Stumer et al. | |
| 7,249,025 B2 | 7/2007 | Junqua et al. | |
| 7,295,669 B1 * | 11/2007 | Denton et al. | 379/265.02 |
| 2002/0090076 A1 | 7/2002 | Uppaluru et al. | |
| 2002/0196928 A1 | 12/2002 | Johnson et al. | |
| 2003/0002650 A1 | 1/2003 | Gruchala et al. | |
| 2004/0109555 A1 | 6/2004 | Williams | |
| 2005/0002516 A1 | 1/2005 | Shtivelman | |
| 2005/0059463 A1 | 3/2005 | Gilmore et al. | |
| 2005/0069102 A1 | 3/2005 | Chang | |
| 2005/0089053 A1 | 4/2005 | Zhu | |
| 2005/0163302 A1 | 7/2005 | Mock et al. | |
| 2005/0286705 A1 | 12/2005 | Contolini et al. | |
| 2006/0030290 A1 | 2/2006 | Rudolf | |
| 2007/0127691 A1 | 6/2007 | Lert, Jr. | |

FOREIGN PATENT DOCUMENTS

| | | |
|---|---|---|
| WO | PCT/AU99/00247 | 4/1999 |

OTHER PUBLICATIONS

Jing Zheng, Horacio Franco, and Andreas Stolcke, "Rate Of Speech Modeling for Large Vocabulary Conversation Speech Recognition", May 18, 2001, (5 pages) Speech Technology and Research Laboratory SRI International, http://www.speech.sri.com.

L.Melscoet, "Alcatel CCweb: Marriage Of The Internet With The Call Center The Alcatel Ccweb Enables a Company to Combine Its Web Site And Call Center Into a Powerful Contact Center", Electrical communication, Alcatel, Brussels, BE, No. 1, 2000, (pp. 43-47).

D.Steul, "Redefining The Call Center: Customer Service On The Internet", Alcatel telecommunications Review, Alcatel, Paris Cedex, FR, Mar. 2000, (6 pages).

* cited by examiner

SYSTEM AND METHOD FOR RETURN TO AGENTS DURING A CONTACT CENTER SESSION

FIELD OF THE INVENTION

The present invention relates generally to the field of contact center communications and automatic call distributors; more specifically, to systems and methods for controlling a call or contact center communication session.

BACKGROUND OF THE INVENTION

Interactive voice response (IVR) systems that provide information and channel calls to service agents in response to the spoken words or touch tone signaling of a telephone caller have been deployed for more than a decade. The traditional call center for handling service calls was based on a private branch exchange (PBX) that included core automatic call distributor (ACD) functions for connecting a caller to one of a plurality of agents served by the ACD. During the 1990s, the advent of the Internet, electronic commerce, and computer telephony integration (CTI) transformed the call center in ways that enabled delivery of caller data to agents, thereby enabling agents to become more efficient and to improve customer service levels. Today, many enterprises use multiple call or contact centers (both terms are used synonymously and interchangeably in the present application) that extend across different geographic regions, with communications taking place through public switched telephone networks (PSTNs) and Internet protocol (IP) enabled networks that support multi-channel (voice, e-mail, text chat, and Web collaboration) customer interaction.

For example, U.S. Pat. No. 6,798,877 teaches a system in which a caller utilizes a personal computer (PC) for establishing an Internet connection to an ACD and for permitting a caller to select a particular agent. A system for providing information about a telephone caller to a telephone agent, wherein caller-specific data of the caller is used to generate a web page that displays the identified information to the agent is taught in U.S. Pat. No. 6,871,212. A system that can notify a customer of the availability status of agents and which allows the customer to select a particular agent from a group of desired agents by pushing a button according to voice guidance given from the ACD is disclosed in U.S. Pat. No. 6,567,848. U.S. Pat. No. 6,847,715 discloses a system for operatively integrating an ACD and an IVR unit in which an interaction input from a caller is stored and then transmitted to an appropriate agent workstation. The session initiation protocol (SIP) is a widely accepted standard for Internet conferencing, telephony, presence, events notification and instant messaging, which incorporates the notion of caller preferences for certain types of interactive communication sessions (e.g., designating a certain genre of music when on hold during a call). A method and apparatus for analyzing the performance of an IVR system with respect to routing of calls or contacts received in accordance with a contact flow model is described in U.S. Pat. No. 6,879,685.

It is common for a caller communicate with multiple agents during the course of a contact center communication session. One problem with the prior art is that when a caller is transferred from to a new agent he is often required to restate his original problem (i.e., his reason for calling) and/or relate the history of his earlier conversations with other agents. Furthermore, often times a caller may want to return to speak with a previous agent who may have demonstrated to be more knowledgeable, or who is already familiar with the circumstances of the caller's particular problem or request. However, in most cases control over the agent selection process resides exclusively with the ACD, or with the agents themselves who typically have access to the communication session call history that is created by existing ACD software.

Thus, what is a needed is a system and method that provides callers with access to call history information and that allows the caller to return to a previous agent during a contact center communication session.

By way of further background, U.S. Pat. No. 6,333,980 discloses an ACD and method for selectively connecting incoming calls to a plurality of available agents based on proficiency ratings of the particular agents. A method and apparatus for controlling an ACD by a supervisor from a remote location is taught in U.S. Pat. No. 6,654,458. U.S. Pat. No. 6,847,715 discloses a method for controlling administration of ACD queues by a controller and of communicating data to an agent. The caller can control which agent should respond to his call, taking into account the different waiting times associated with a particular agent or the first available agent when the caller reaches the end of the queue.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A system and method that allows a caller to choose to return to a particular agent out of a plurality of agents that the caller has already interacted with during an ongoing communication session is described. In the following description specific details are set forth, such as device types, configurations, communication methods, etc., in order to provide a thorough understanding of the present invention. However, persons having ordinary skill in the arts will appreciate that these specific details may not be needed to practice the present invention.

According to one embodiment of the present invention, a contact center provides an interactive interface (e.g., a web-based graphical user interface) that allows a caller to communicate with a plurality of service agents in a rich media environment. As a call is transferred from one agent to another, the contact center system updates and displays call or communication session history information to the caller, which information includes a listing of the previously contacted agents. The system also provides the caller with the ability to return to a particular agent by selecting or "clicking" on a visual representation (e.g., icon) associated with that agent appearing on the graphical user interface. A caller or user (in the context of the present application both terms are used synonymously) who elects to return to an agent in this manner is automatically placed in queue to wait until that agent is available. In certain implementations, the caller may be placed in a special wait queue reserved for "returning callers"; that is, callers who elect to return to a particular agent. The special wait queue may provide the returning caller with priority over other callers (e.g., those in the regular queue) to speak with the particular agent.

Figure 1:
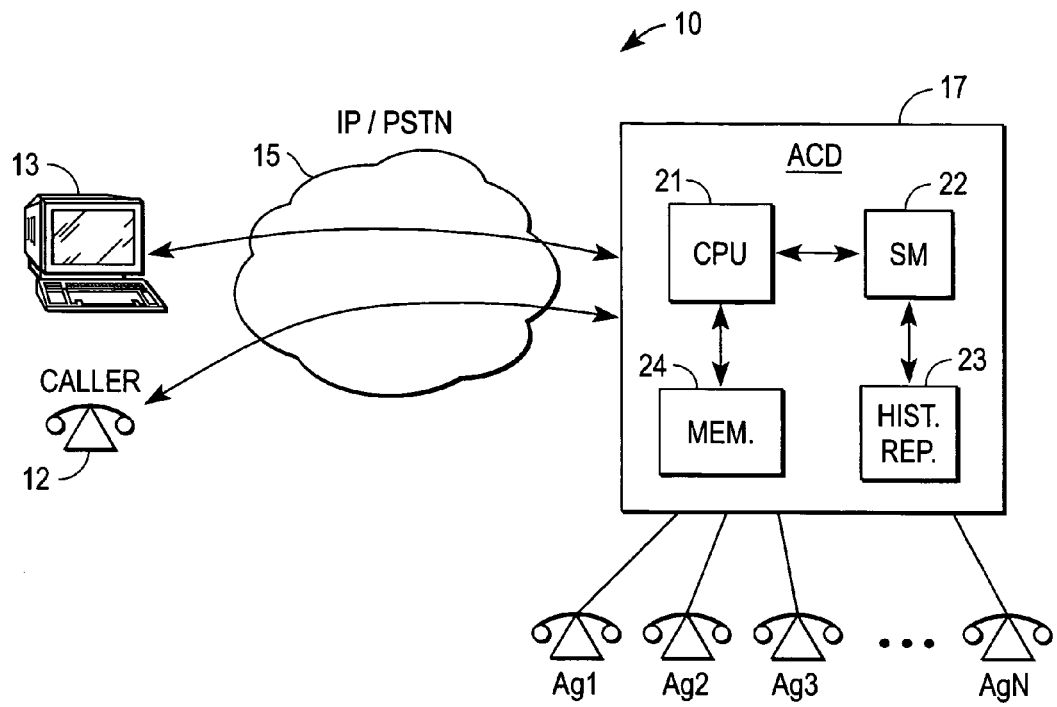
FIG. 1 is a conceptual diagram of a contact center system in accordance with one embodiment of the present invention.

FIG. 1 is diagram of a contact center system in accordance with one embodiment of the present invention, which system includes an ACD 17 connected with a plurality of agents ($Ag_1, Ag_2, Ag_3 \ldots, Ag_N$). ACD 17 is configured to receive and service calls from a variety of sources across different communication media, represented by "cloud" 15. Communication media cloud 15 may comprise a traditional PSTN for connecting a caller using a telephone 12 to ACD 17, or, alternatively, for connecting a caller utilizing a personal computer (PC) 13 to interact with ACD 17 via a packet-based Internet Protocol (IP) network.

The diagram of FIG. 1 shows ACD 17 including a processor subsystem 21 comprising one or more processors (simply denoted "CPU") coupled with a memory ("system memory") 24 and software module (SM) 22. Software module 22 may also be implemented in firmware or some combination of hardware/software elements. A historical reporting module 23 that operates to build up the call history as it develops for use by the various agents during the contact center session is coupled to software module 22. Although not explicitly shown, processor subsystem 21 may also be coupled directly to historical reporting module 23. Data may also be transferred between processor subsystem 21, memory 24, software module 22, and historical reporting module 23 over one or more buses, such as a memory or system bus. By way of example, the system bus may include the conventional peripheral component interconnect (PCI) bus.

Software module 22 includes executable code that provides a caller with access to the interactive history information of a call session as it develops during the contact center session. This call history information is typically generated by historical reporting module 23 and may include a listing of the various agents that the caller has interacted with, the length of time of each interaction, comments regarding each experience, etc. In one embodiment, software module 22 also includes code for generating a visual user interface for a caller communicating via PC 13. This visual user interface may comprise an ACD collaborative web-based application that is accessed by the browser software running on PC 13. In other instances, the interface may comprise a downloaded application for execution on PC 13, or other forms of computer-executable code that may be loaded or accessed by PC 13.

Figure 2:
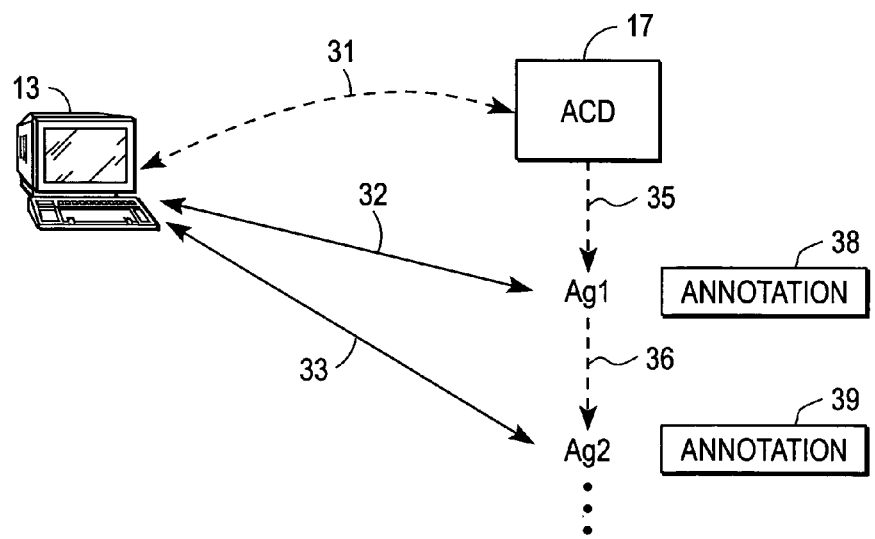
FIG. 2 illustrates a process of generating a call history with caller annotations in accordance with one embodiment of the present invention.

In a specific implementation, the visual user interface may permit the caller to annotate his experience with each agent by entering (e.g., typing on a keyboard) remarks in an associated annotation field. This process is illustrated in FIG. 2, wherein establishment of the collaborative, interactive application between PC 13 and ACD 17 is shown by dashed line 31, and transfer of the call to a first agent ($Ag_1$) is shown by dashed line 35. Interaction between the caller (via PC 13) and the first agent is represented by line 32, with the annotation field associated with the first agent being shown by block 38. In one embodiment, annotation field 38 appears next to the first agent's name on the visual user interface provided on PC 13. The caller may enter his comments (e.g., feedback grade, remarks regarding his experience with the agent, etc.) into field 38 anytime during or after his interactive session with the first agent. In the example of FIG. 2, the caller is transferred from the first agent to a second agent ($Ag_2$) as shown by dashed line 36. Interaction between the caller and the second agent is represented by line 33, with the annotation field associated with the second agent being shown by block 39. This process may continue with the caller being transferred to still other agents connected with ACD 17.

The call history information shown in FIG. 2, including the user-input comments in annotation fields 38 & 39, is made available to the caller via the visual user-interface display during the contact center communication session. (It is appreciated that the actual names or identities of the agents may be hidden from the caller for privacy purposes. For instance, a nickname or other identifier may be used by each of the agents, with the nicknames being displayed on PC 13.) In addition, the graphical user interface on PC 13 includes a mechanism (e.g., clicking on an icon) that permits the caller to return to a previous agent. That is, anytime during the communication session the caller may end his interactive session with a current agent and return to a previous agent. The caller's selection of a previous agent is facilitated by visual display of the call history information on PC 13. The process of returning to a previous agent in the call history listing may be repeated multiple times.

Practitioners in the art will appreciate that the graphical user interface may also be provided on a display screen of a caller device other than a PC. For instance, a visual user interface may be provided on a display screen of a cell phone of the caller, with agent selections and annotation entries being made by keypad or voice input commands of the caller.

It is further appreciated that in the above-described embodiment the interactive interface and the process of returning to a previous agent is enabled by software module 22 in conjunction with historical reporting module 23 and processor subsystem 21. In another embodiment, ACD 17 may be configured to control the above process by placing appropriate limitations on the ability of a caller to return to a particular agent. For example, instead of allowing a caller to invoke a transfer to a previous agent at any time, parameters within software module 22 of ADC 17 may be configured such that only a current agent may invoke a return to a previous agent. In other words, a caller may specifically request that a current agent return the caller to a previous agent, however, the current agent retains control to actually invoke the transfer. In this way, the current agent may attempt to clarify the problem, solicit further information, or report a reason for the transfer in the historical record.

In still another alternative embodiment, whenever a caller invokes the functionality to return to a previous agent the ACD system flags the request and notifies a supervisor associated with the contact center. At that point, the supervisor may intercept the call and take over the session to insure good customer service or to simply inquire about the reason for the transfer. Another possibility is to permit a caller to make a certain number of invocations to return to a previous agent before a supervisor steps in and takes over control of the transfer process. For instance, a caller may be allowed to invoke two transfers to a previous agent, with a third transfer attempt resulting in notification to a supervisor who may then assume control over the call and any further transfers. The supervisor, for example, may query the caller to determine the reason for the transfer request and either allow or disallow the transfer. This latter embodiment insures that a caller can not disrupt or unduly dominate contact center system resources.

Figure 3:
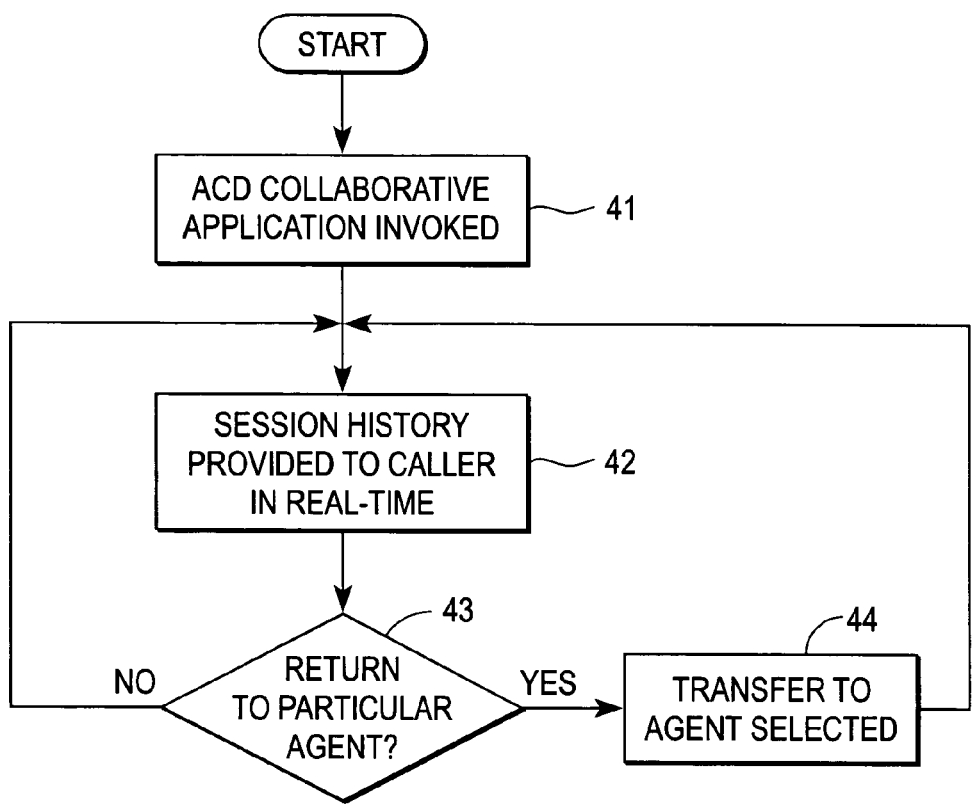
FIG. 3 is a flowchart diagram that illustrates a method of operation according to one embodiment of the present invention.

FIG. 3 is a flowchart diagram that illustrates a method of operation according to one embodiment of the present invention. When a call is received at the contact center from a media-rich device such as PC 13, the ACD collaborative application is automatically invoked (block 41). The start-up of the collaborative application results in pop-up of a visual user interface on the screen of PC 13, with a listing of the session history, including the current agent being displayed (block 42). The session history listing is updated in real-time with each transfer or entry of information by the agent or the caller. As discussed previously, the caller may elect to return to a particular agent at any time during the communication session (block 43). In one implementation, selection of the return-to-agent option by the caller results in immediate transfer to the selected agent (block 44). Alternatively, control over the transfer may reside with an agent or supervisor associated with the contact center system. Following transfer, the session history is updated on the visual user interface (block 42). The session continues in this manner until the call ends.

Figure 4:
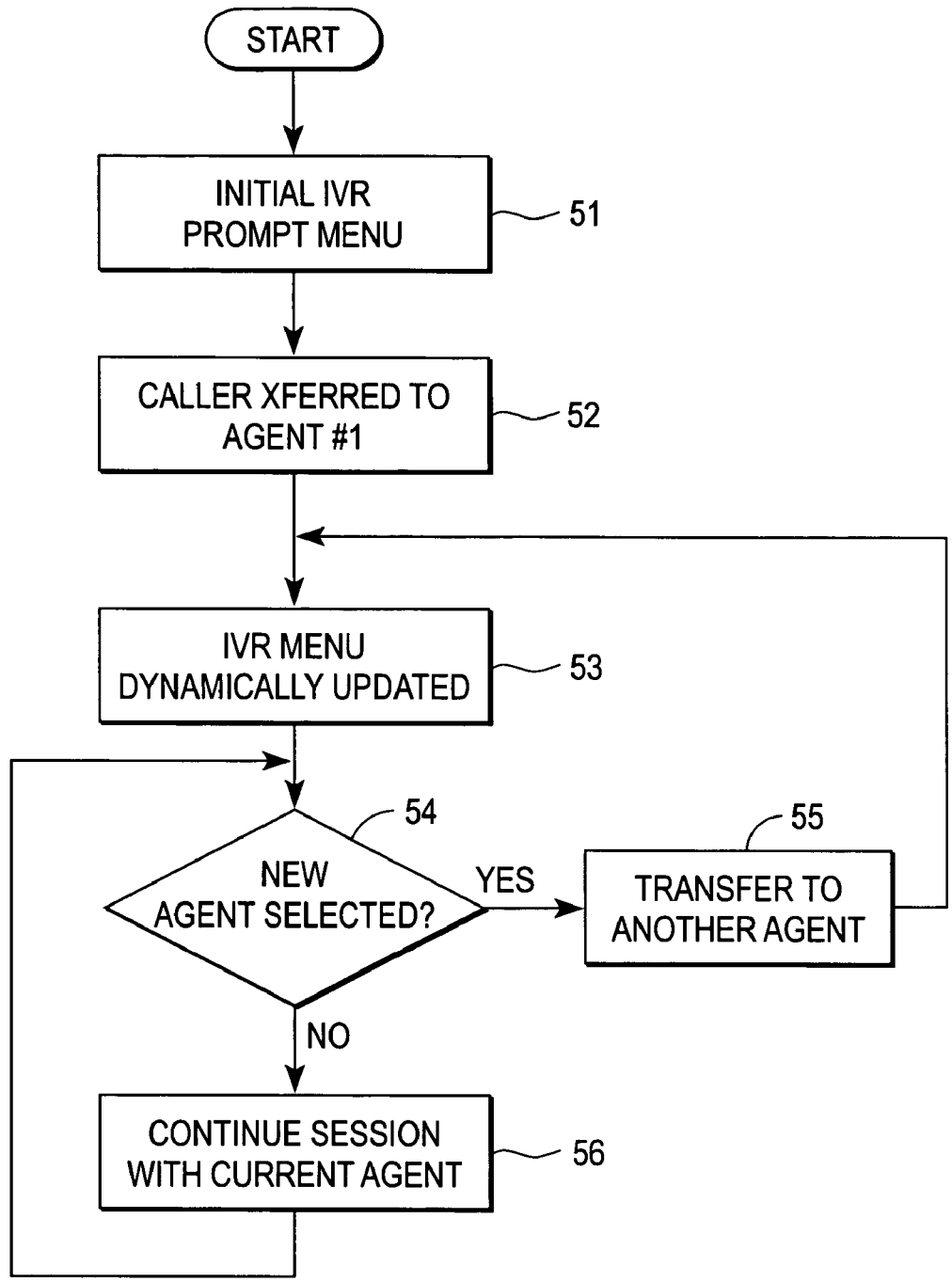
FIG. 4 is a flowchart diagram that illustrates a method of operation in accordance with another embodiment of the present invention.

FIG. 4 is a flowchart diagram that illustrates a method of operation in accordance with another embodiment of the present invention. Instead of originating from a PC, in the embodiment of FIG. 4 the call is received by ACD 17 from some type of telephonic device (e.g., standard telephone, wireless cell phone, VoIP phone, etc.). In this case, ACD 17 executes an initial telephony (IVR) prompt menu (block 51) that may solicit information from the caller and generally attempt to resolve the caller's request or problem without the need for live agent assistance. For example, if the caller simply wants to know his account balance, this information may be provided through the initial IVR self-service menu. If the initial IVR menu is unable to satisfy the caller's request or problem, the call is eventually transferred to a first available agent (block 52).

At this point, ACD 17 dynamically creates and updates a new IVR prompt menu based on the call session history (block 53). This new IVR menu functions as a voice or aural interface that periodically provides the caller with an updated call history in the form of an automated voice script. For example, each time the caller is transferred to an agent, the IVR menu may play out a voice script that recounts the call history, including which agents the caller has already spoken with. Additionally, the IVR menu may provide the caller with the option of returning to a previous agent by voice command, touch-tone entry, or keypad response (block 54). When the caller elects to return to a previous agent, he may be placed in queue until that agent is available. After the transfer occurs (block 55), the IVR menu is dynamically updated and the process repeats. Of course, the caller may continue his session with the current agent, without ever returning to a previous agent, as indicated by block 56.

Another possibility is to configure the ACD system such that the caller can select, at any time, a menu item to play a prompt or script that lists the names of the various agents with whom the caller has already spoken. The IVR menu may also present an option for the caller to enter a queue to return to one of the agents listed.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMS, EEPROMs, magnet or optical cards, propagation media or other type of machine-readable medium suitable for storing electronic instructions. Elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer-readable memory encoded with a computer program for servicing a call from a caller, when executed, the computer program operable to:
   provide the caller with a call session history listing each agent with whom the caller has interacted with during the call;
   invoke an application that provides a user interface on a device of the caller;
   provide the caller with a first option to return to a previous agent whom the caller has interacted with during the call, the option being selectable via the user interface, and
   provide the caller with a second option of annotating an interactive session with a particular agent during the call; and
   wherein the computer program is executed on a processor of an automatic call distributor (ACD) for placing a control limit on the ability of the caller to execute the first option during the call.

2. The computer-readable memory of claim 1 wherein the computer program comprises an interactive voice response (IVR) system.

3. A computer-readable memory encoded with a computer program for servicing a call from a caller, when executed, the computer program operable to:
   provide the caller, during the call, with a call session history listing each agent with whom the caller has interacted during the call;
   provide the caller with a first option selectable via a graphical user interface, the option allowing the caller to request return to a previous agent whom the caller has interacted with during the call;
   transfer the call to the previous agent responsive to selection of the first option by the caller followed by an approval provided by an agent or supervisor associated with a contact center; and
   wherein the graphical user interface includes an annotation field associated with each agent listed in the call session history, the graphical user interface being configured to permit the caller to enter comments in the annotation field during the call; and
   wherein the computer-readable memory encoded with the computer program for placing a control limit on the ability of the caller to execute the first option during the call.

4. The computer-readable memory of claim 3 wherein the computer program comprises an interactive voice response (IVR) system.

5. The computer-readable memory of claim 3 wherein the computer program is further operable to dynamically create an IVR prompt menu during the call based on a current status of the call session history.

6. The computer-readable memory of claim 5 wherein the IVR prompt menu includes a caller-invoked option to play a script that lists all agents with whom the caller has already spoken during the call.

7. A computer-readable memory encoded with a computer program for servicing a call from a caller at a contact center, when executed, the computer program operable to:
- provide the caller with an interactive voice response (IVR) menu;
- dynamically create a call session history script during the call that includes a listing of each agent with whom the caller has interacted during the call;
- update the IVR menu during the call with the call session history script;
- prompt the caller, during the call, with the call session history script and a menu option to request return to a previous agent whom the caller has interacted with during the call;
- provide the caller with an option of annotating an interactive session with a particular agent during the call;
- dynamically update the call session history script of the IVR menu following return of the caller to the previous agent; and
- place a control limit on the ability of the caller to execute the option to request return to the previous agent whom the caller has interacted with during the call.

* * * * *